United States Patent Office 3,266,148
Patented August 16, 1966

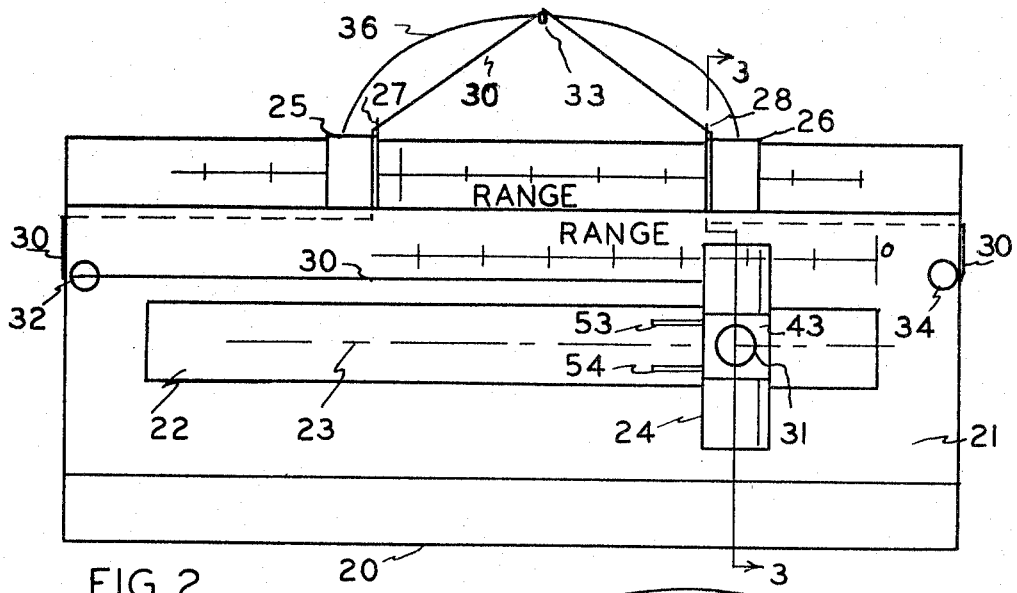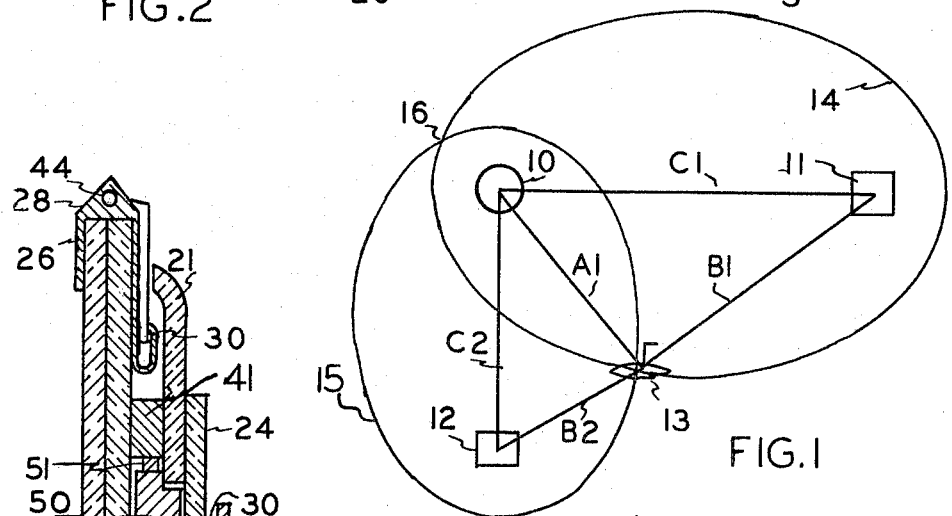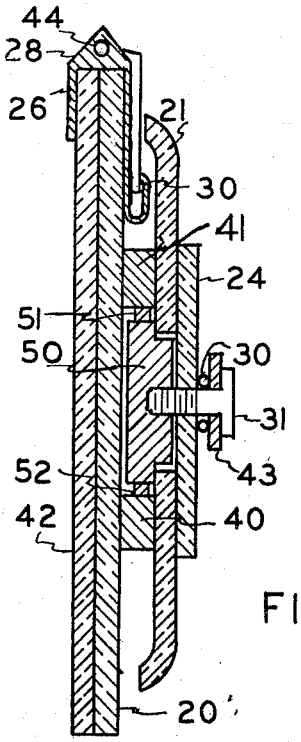

3,266,148
ASW TACTICAL PLOTTER
David B. Heald, 5247 N. 17th Ave., Phoenix, Ariz.
Filed May 26, 1965, Ser. No. 459,136
4 Claims. (Cl. 33—30)

The invention described herein may be manufactured and used by or for the Government of the United States of America for governmental purposes without the payment of any royalties thereon or therefor.

This invention relates to a tactical plotter and more specifically to an improved navigational device for solving particularly problems in anti-submarine warfare situations.

With the ever increasing complexity and sophistication of submarines there has been an increasing sophistication in anti-submarine warfare devices and techniques to locate and destroy them. Many systems have been evolved, some of which are combinations of multiple methods and each has its own specific advantage under certain favorable conditions.

One such technique involves the dropping of a hydrophone or underwater listening device into the ocean at a predetermined spot and at some known distance therefrom an explosive charge is dropped which will detonate at a predetermined time after water entry. At some time later, should the spherically expanding sound wave in water encounter a submerged submarine an echo will be reflected from the submarine. This echo will reach the hydrophone at a time later than the sound from the charge because the path of sound travel for the echo is not along a direct line as is the case of the sound from the charge.

In the jargon of the anti-submarine warrior the distance between the hydrophone and the explosive charge is known as "C," the distance between the explosive charge and the submarine is known as "B," and the distance from the submarine ot the hydrophone is referred to as "A." Thus, since the speed of sound is known and the distance "C" is known, the distance during the time for the sound wave to travel from the charge to the submarine then to the hydrophone is known as "A+B." Since the first sound recorded is from the charge, which has already traveled the "C" distance to be recorded, the range will be the difference in sound travel distances between path "C," for the charge, and path "A+B," for the echo, or "A+B−C." This relationship is evident due to the fact that a sound wave will travel at a relatively uniform rate through the water, assuming the conditions of salinity and temperature are constant.

An airplane whicch has accomplished the drop of the hydrophone and the drop of the charge has the problem of determining from the navigational positions of the two devices, that is the charge and hydrophone, the position of the submarine. This is generally done by dropping two or more charges about a single hydrophone and recording two or more return echos. From the mechanics of the operation it is obvious that the navigators flying in the aircrafts must operate at a fairly high speed, in a considerably cramped position and in limited quarters with a minimum of equipment. In the past this has placed serious limitations on the ability to accomplish the desired mission in the minimum amount of time.

It is therefore an object of this invention to improve the techniques and speed and plotting position of unknown submarine from echos received by a hydrophone.

It is a further object of this invention to provide an improved elliptical drawing device for plotting positional fixes of submerged submarines.

It is yet a further object of this invention to provide an improved tactical plotter having positional cursors and flexible means attached thereto for drawing a variety of sized ellipses to plot positional fixes of submerged submarines.

It is still a further object of this invention to provide a tactical plotting device for providing a guide for drawing ellipses of varying size and foci spacing, comprising; a base member, a flexible member having first and second ends, the first end affixed to the base member, a first movable member mounted on the base member, the second end affixed to the first movable member, a second movable member mounted on the base member, the flexible member movably held by second member, and a passageway in the base member, the flexible member passing through the passageway and the first movable member positional to fix the amount of said flexible member between the movable member and the passageway.

Further objects, advantages and novel features of the invention will become apparent from the following detailed description of the invention when considered in conjunction with the accompanying drawings wherein:

FIGURE 1 shows in a simplified form a tactical plotting situation;

FIGURE 2 is a detailed view of a tactical plotter incorporating this invention; and FIGURE 3 is a sectional view along lines 3—3 in FIGURE 2.

In FIGURE 1 there is shown a tactical plot of the problem involved in locating a submarine from the return echo received by a hydrophone. Therein, a circular item 10 represents a hydrophone positioned in the water. The small square figures 11 and 12 represent underwater explosive devices which when detonated produce a single impulse of sound. Schematically a submarine 13 is shown and locating of the submarine is as follows. An aircraft, not shown, flying along a course, generally along the line C1, drops the hydrophone 10 and at a predetermined time later an explosive charge 11. Upon completing the drop of charge 11 it will fly a course to drop a second charge 12 at a second position, and a distance C2 from the hydrophone 10. When the explosive charge 11 is detonated the sound will start travelling along line C1 and at the same time along line B1. Since the speed of sound in seawater is substantially constant, when the salinity and temperature is known and no interferences are encountered, it will take a definite time for the sound to reach hydrophone 10. During this time the sound has gone from the explosive charge 11 to the submarine and as shown has been reflected the distance along line A1 towards hydrophone 10. A radio transmitter broadcasts all signals received by the hydrophone to the operators in the airplane and at some time later a sound echo from charge 11 is received from the submarine 13, and the time difference between the two signals is referred to as a range. Thus, it is obvious that the time for sound to travel the path B1, A1 may position the submarine any place on an elliptical path 14 with the hydrophone 10 as one focus and the charge 11 as the other.

In a like manner charge 12 produces a sound wave which will reach the hydrophone 10 and at a finite time later a second signal will be received from the explosion 12 echoed from the submarine 13 along line A1 giving a second range to the submarine. Thus, a second elliptical plot 15 may be obtained along which the submarine might lie. It is evident that the submarine is either at the position shown or at the other intercept 16 of the two plotted paths. Having dropped two explosive charges and located the submarine at one of two points the airplane might drop a third charge to locate the submarine at one of the two points, or might use other equipment to more specifically locate the submarine.

It is obvious that if the airplane were to drop a hydrophone and the explosive charge at the same point 10 a sound wave going out to a submarine 13 and back would produce a circular plot since the distance "C" becomes substantially zero and the course of sound travel would be out along B1 and back A1, which coincide, and when divided by two will give the range to the submarine.

The invention incorporated within this application provides an extremely accurate, fast, and rugged piece of equipment to plot the elliptical paths from the known positions and plots of hydrophone 10 and explosive charges 11 and 12.

Referring now more specifically to FIGURES 2, and 3 wherein the device as shown operates as follows.

A much simplified view of a tactical plotter incorporating the invention is shown in FIGURE 2. It is to be understood that additional scales and functions which would be placed on a usable device have been left off for the sake of clarity to more specifically set forth the invention as herein incorporated. A transparent base member or plate 20 is shown having a second plate 21 located thereon which has an elongated aperture or slot 22 positioned longitudinally along its major axis 23. The plate 21 has two scales labeled range printed thereon, and although two are provided to make the device more versatile, it is to be understood that a single range scale is all that is necessary. A movable member or adjustable range cursor 24 is mounted in aperture 22 and has a construction, as shown in more detail later on which may be positioned at any place along the aperture 22 and is constructed to resist sliding once it is positioned.

Second and third cursors 25 and 26 are movably mounted on plate 20, each having an extending pointer 27, 28 respectively. In the tactical plotting situation as shown in FIGURE 1 one pointer is placed at the hydrophone position 10 and the other pointer is placed at the location of the explosive charge 11. A range scale between cursors 25, 26 on the plotter gives the distance between the two. A flexible member or string 30 tied to a binding post 31 on cursor 24, runs along the surface of plate 21 and through a hole 32 around an end of a spacer as hereinafter shown along the dashed line 30, underneath plate 21, out along cursor 25, through a passageway or hole in pointer 27, out about a pencil point 33, through passageway or a hole in pointer 28, along cursor 26, underneath plate 20, around spacer and to the tie hole 34.

When it is desirable to calibrate the tactical plotter, range cursor 24 is positioned at the extreme right of the slot or aperture 22, at the zero position. There is then sufficient string to tautly follow the path as previously described with the string extending in a straight line between pointers 27 and 28. It is obvious that the cursors 25 and 26 may be slid to any place along plate 20, while the string remains in a taut position therebetween.

Thus, when a tactical plotting situation is encountered pointers 27 and 28 are positioned as previously described, and when the operator is given a range, range cursor 24 is moved along the first range scale to the range given and sufficient amount of string is then available between pointers 27 and 28, so that pencil point 33 may be looped therein and an ellipse drawn as shown by line 36. It should be noted that with this construction and the device held substantially perpendicular to the plane of the paper upon which the plot is being made a complete ellipse may be drawn without the instrument being lifted from the paper.

FIGURE 3, a detailed view along lines 3—3 in FIGURE 2 shows the details of construction of the device. Plate 20 and plate 21 are shown, spaced from each other by a pair of spacers 40 and 41, which rigidly mount the two plates to each other by a means not shown, and at the same time provide adequate space between plates 20 and 21, for cursor 26 to be movably positioned along plate 20 and an additional transparent plate 42 which is fixed to plate 20 and can have additional range or distance information printed thereon to provide scales of distance between foci and/or other information which are viewable through transparent plate 20. Range cursor 24 and screw 31 are shown, in addition a plate 43 is provided to rigidly hold string 30 thereabout after it has been adjusted to the proper length. String 30 is also shown passing through a curved portion of cursor 26 and extending on out through a hole 44 in pointer 28. It is obvious that the cursor 26 may be movably positioned along plates 20 and 42.

In addition a block 50 is provided into which the screw 31 fits and the entire assembly of block 50, cursor 24, and screw 31 is movably positioned along the slot or aperture 22. A pair of spring members 51, 52 are shown and frictionally hold block 50 between the spacer members 40, 41. A pair of upstanding arms, shown more clearly as 53, 54 in FIGURE 2 are provided for compressing the spring members 51 and 52 to release the block 50 so that the range cursor 24 may be positioned along the aperture. Once positioned arms 53 and 54 are released and the range cursor 24 is held substantially rigid within the aperture 22.

Obviously many modifications and variations of the present invention are possible in the light of the above teachings. It is therefore to be understood that within the scope of the appended claims the invention may be practiced otherwise than as specifically described.

I claim:
1. An improved elliptical plotter, comprising:
 (a) an elongated planar transparent base member of given length;
 (b) an elongated planar transparent plate member affixed to said base member, having an elongated slot along a major axis of said plate member and having first and second ends;
 (c) a first range scale on said plate member extending parallel to said axis;
 (d) a first range cursor slidably mounted in said slot to move along said slot.
 (e) a second cursor slidably mounted on said base member having a first tip with a first hole therein;
 (f) a third cursor movably mounted on said base member having a second tip with a second hole therein;
 (g) a second range scale on said base member extending parallel to said axis;
 (h) a first binding post on said range cursor;
 (i) a second binding post at said first end of said plate member;
 (j) a third hole in said second end of said plate member;
 (k) a flexible string member substantially twice the length of said base member affixed to said first binding post extending through said third hole in said plate, through said first and second holes in said first and second tips and affixed to said second binding post, said flexible member being capable of guiding a drawing implement in an elliptical path of variable size depending upon the position of said range cursor and second and third cursors.

2. The plotter of claim 1 wherein said second and third cursors are movable along said second range scale.

3. The plotter of claim 2 wherein said first and second tip when positioned at the major foci of an ellipse position said flexible string member to guide said drawing implement in a substantially complete elliptical path.

4. An improved elliptical plotter, comprising:
 (a) an elongated planar transparent base member having at least one straight edge of given length;
 (b) an elongated planar transparent plate member affixed to said base member, having an elongated slot along a major axis of said plate member and having first and second ends;
 (c) a first range scale on said plate member extending parallel to said axis;

(d) a first range cursor slidably mounted in said slot to move along said slot substantially the full length of said plate member;
(e) a second cursor slidably mounted on said base member along said straight edge having a first tip with a first hole therein;
(f) a third cursor movably mounted on said base member along said straight edge having a second tip with a second hole therein, said second and third cursors movable along susbtantially all of said straight edges without interfering with said first range cursor;
(g) a second range scale on said base member extending parallel to said axis;
(h) a first binding post on said range cursor;
(i) a second binding post at said first end of said plate member;
(j) a third hole in said second end of said plate member;
(k) a flexible string member, at least twice the length of said base member, affixed to said first binding post extending through said third hole in said plate, through the said first and second holes in said first and second tips and affixed to said second binding posts, said flexible member being capable of guiding a drawing implement in an elliptical path of variable size depending upon the position of said range and first and second cursors.

References Cited by the Examiner

UNITED STATES PATENTS

| | | | |
|---|---|---|---|
| 1,488,641 | 4/1924 | Johnston | 33—30 |
| 2,256,011 | 9/1941 | Ballow | 33—30 |

FOREIGN PATENTS

| | | |
|---|---|---|
| 808,161 | 7/1951 | Germany. |
| 648,514 | 1/1951 | Great Britain. |

LEONARD FORMAN, *Primary Examiner.*

ISAAC LISANN, *Examiner.*

H. N. HAROIAN, *Assistant Examiner.*